Jan. 20, 1925.  1,523,732
W. A. TRATSCH ET AL
AMUSEMENT DEVICE
Filed Nov. 12, 1921   10 Sheets-Sheet 1

Inventors
Walter H. Tratsch and
Archie H. Bechtol
by
T. A. Witherspoon
Attorney

Jan. 20, 1925.  
W. A. TRATSCH ET AL  
1,523,732  
AMUSEMENT DEVICE  
Filed Nov. 12, 1921   10 Sheets-Sheet 5
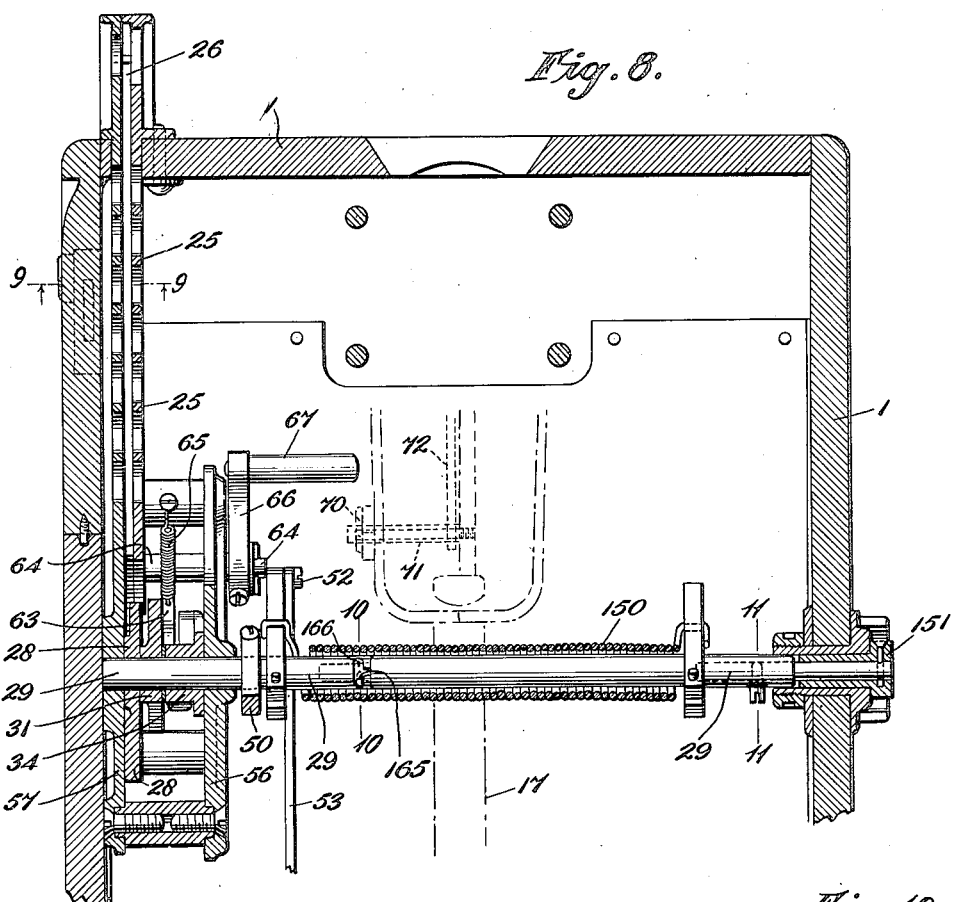
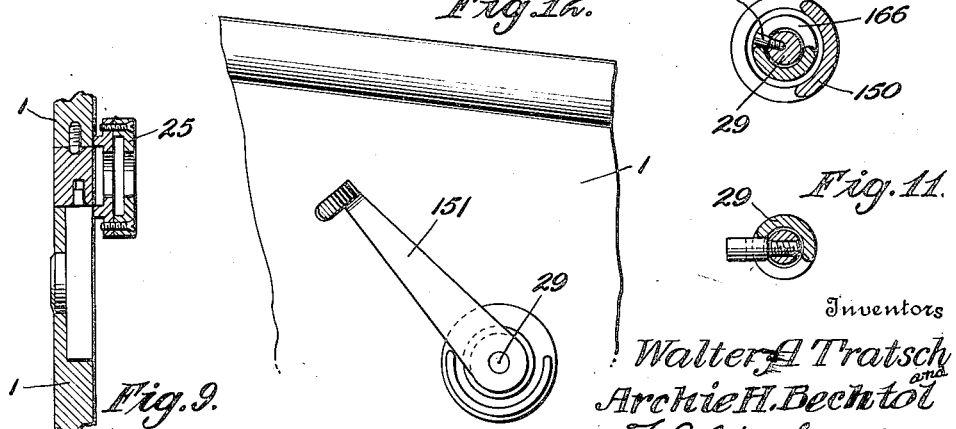
Inventors  
Walter A Tratsch  
Archie H. Bechtol  
by J. G. Witherspoon  
Attorney Inventors
Walter A. Tratsch and
Archie H. Bechtol
by T. G. Witherspoon
Attorney Jan. 20, 1925.  1,523,732
W. A. TRATSCH ET AL
AMUSEMENT DEVICE
Filed Nov. 12, 1921  10 Sheets-Sheet 7
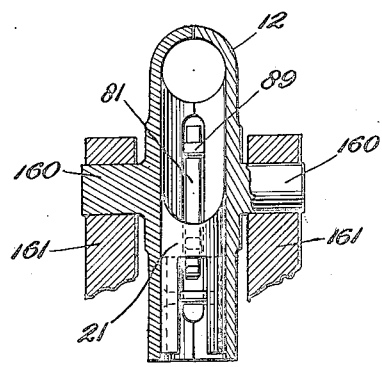
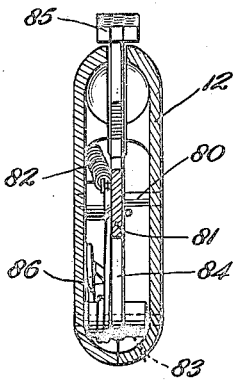
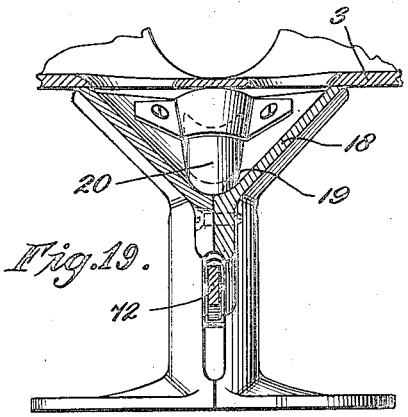
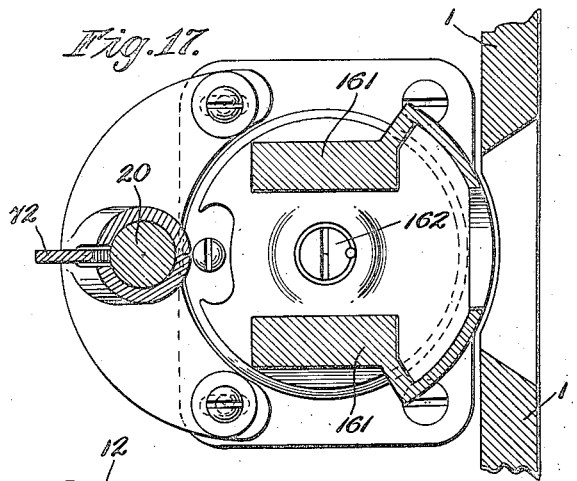
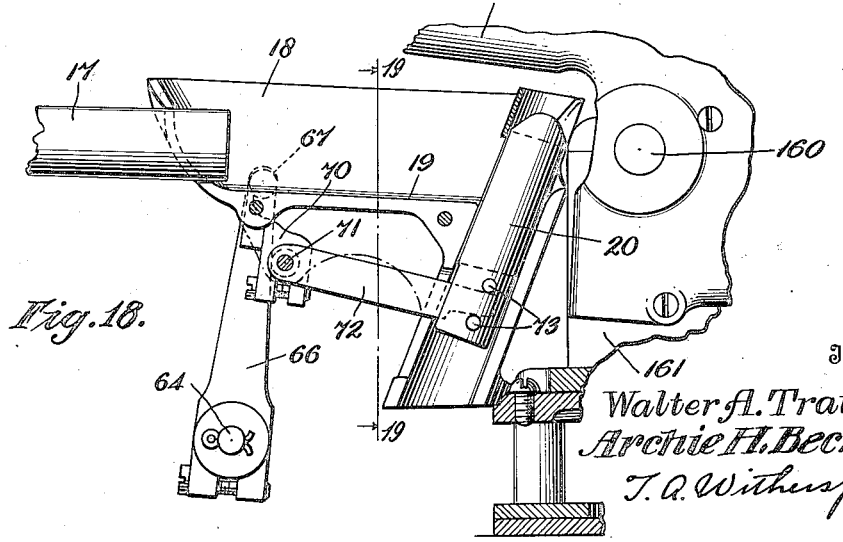
Inventors
Walter A. Tratsch and
Archie H. Bechtol
J. Q. Witherspoon
Attorney Jan. 20, 1925.
W. A. TRATSCH ET AL
1,523,732
AMUSEMENT DEVICE
Filed Nov. 12, 1921   10 Sheets-Sheet 8
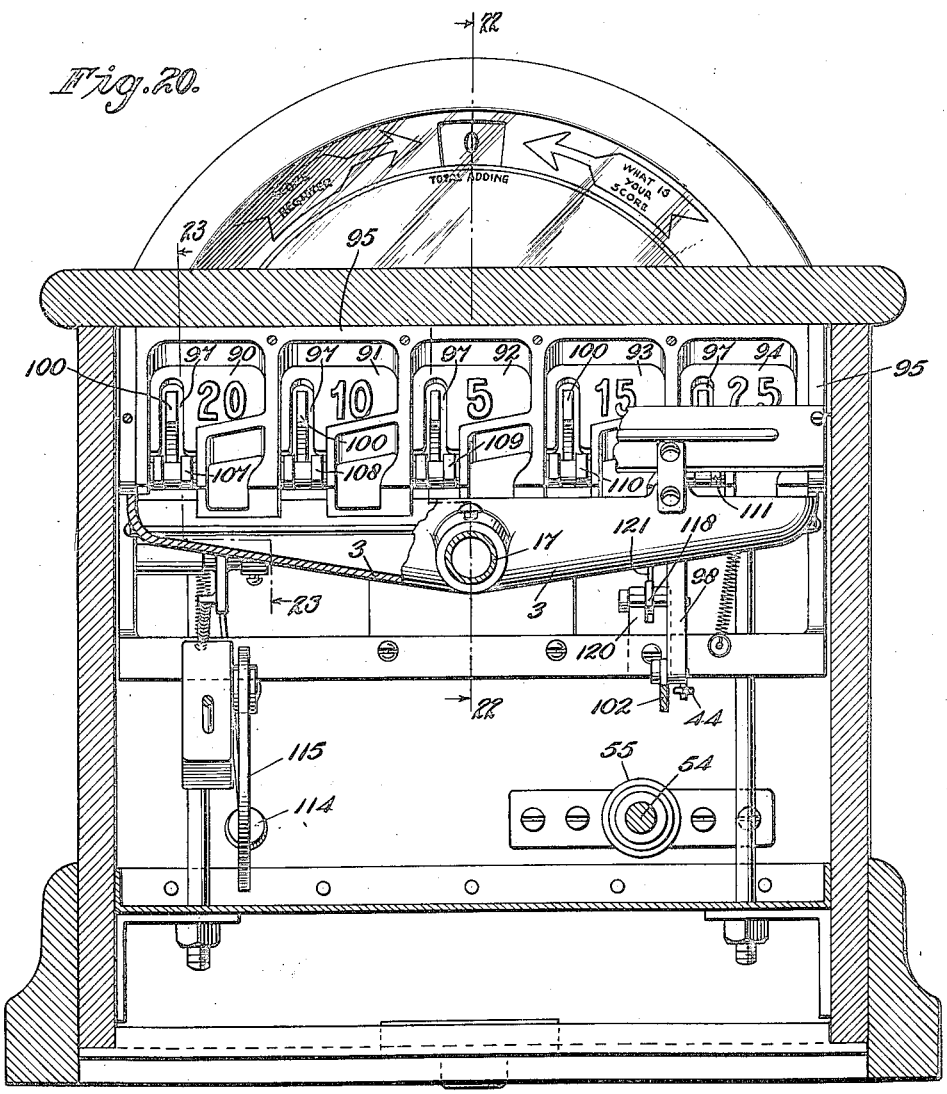
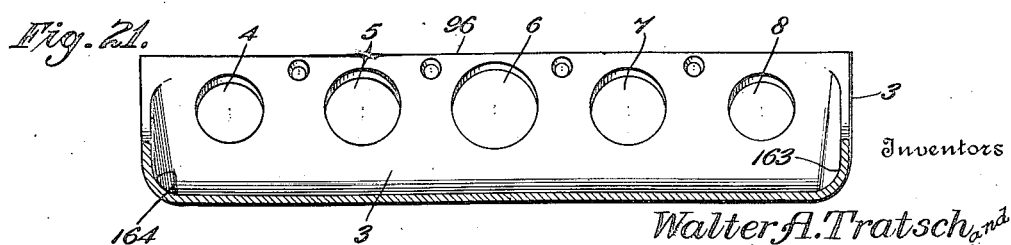
Inventors
Walter A. Tratsch and
Archie H. Bechtol
by T. G. Witherspoon
Attorney

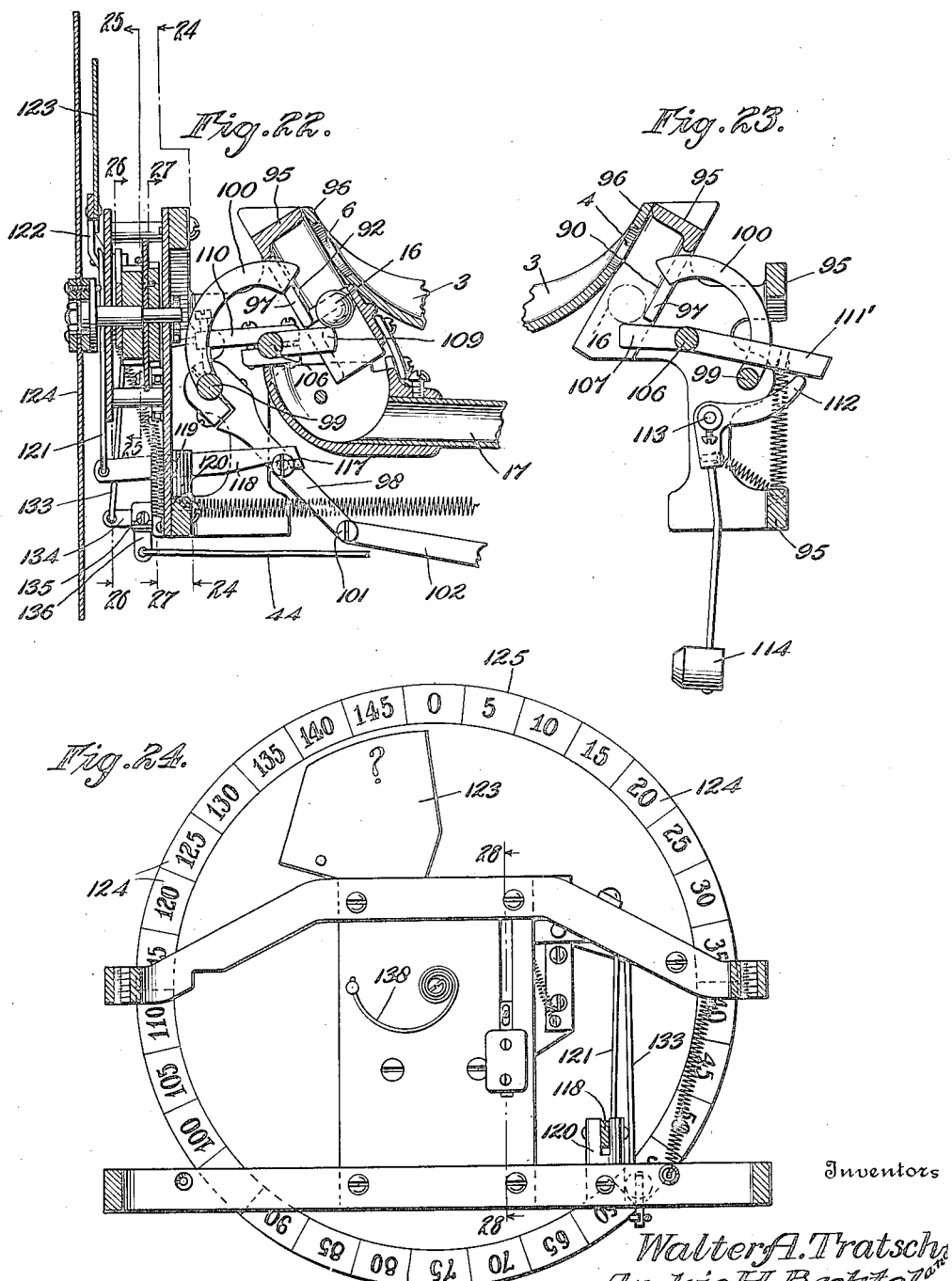

Jan. 20, 1925.
W. A. TRATSCH ET AL
1,523,732
AMUSEMENT DEVICE
Filed Nov. 12, 1921    10 Sheets-Sheet 10
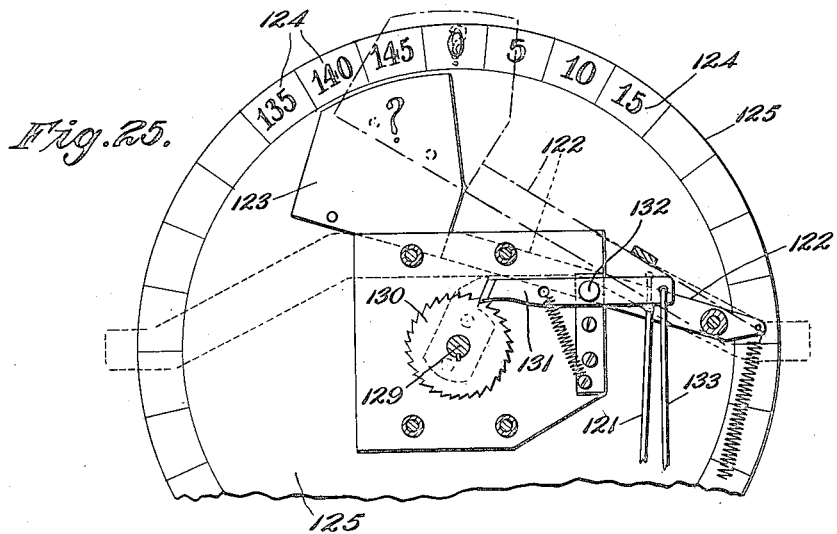
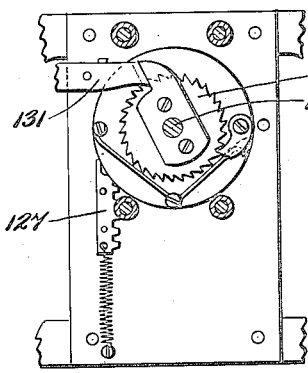 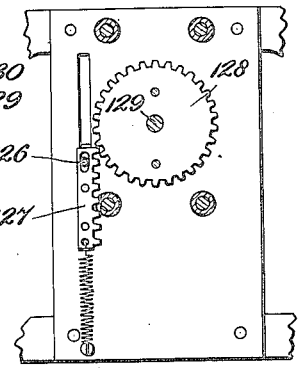 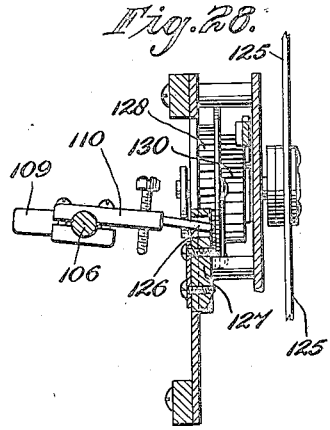
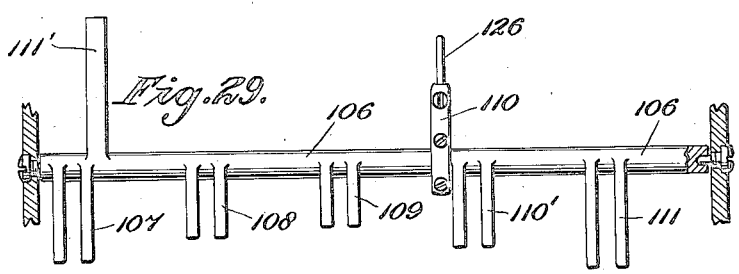
Inventors
Walter A. Tratsch and
Archie H. Bechtol
T. A. Witherspoon
Attorney Patented Jan. 20, 1925.

1,523,732

UNITED STATES PATENT OFFICE.

WALTER A. TRATSCH AND ARCHIE H. BECHTOL, OF MEMPHIS, TENNESSEE.

AMUSEMENT DEVICE.

Application filed November 12, 1921. Serial No. 514,746.

*To all whom it may concern:*

Be it known that we, WALTER A. TRATSCH and ARCHIE H. BECHTOL, citizens of the United States, residing at Memphis, in the county of Shelby and State of Tennessee, have invented certain new and useful Improvements in Amusement Devices; and we do hereby declare the following to be a full, clear, and exact description of the invention, such as will enable others skilled in the art to which it appertains to make and use the same.

This invention relates to an amusement device and has for its object to provide an apparatus of this character which will be simple in construction, efficient in operation, certain in action, and less costly to produce than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 8 is a cross sectional view taken on the line 8—8 of Figure 5;

Figure 9 is an enlarged sectional detail view taken on the line 9—9 of Figure 8;

Figure 10 is a view of the operating shaft taken on the line 10—10 of Figure 8;

Figure 11 is a view of the operating shaft taken on the line 11—11 of Figure 8;

Figure 12 is a side elevational view of the lever operating the shaft;

Figure 15 is a sectional detail view taken on the line 15—15 of Figure 13, looking in the direction of the arrows;

Figure 16 is a detail sectional view taken on the line 16—16 of Figure 13, looking in the direction of the arrows;

Figure 2:
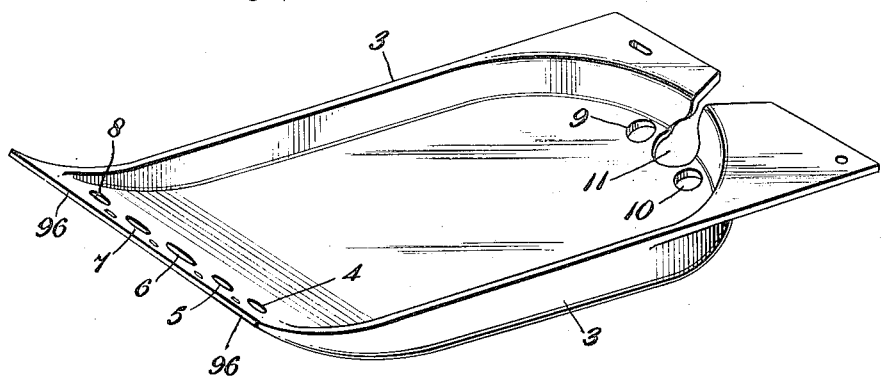
Figure 2 is a perspective view of the metal tray over which the balls play, employed by this invention.
Figure 3:
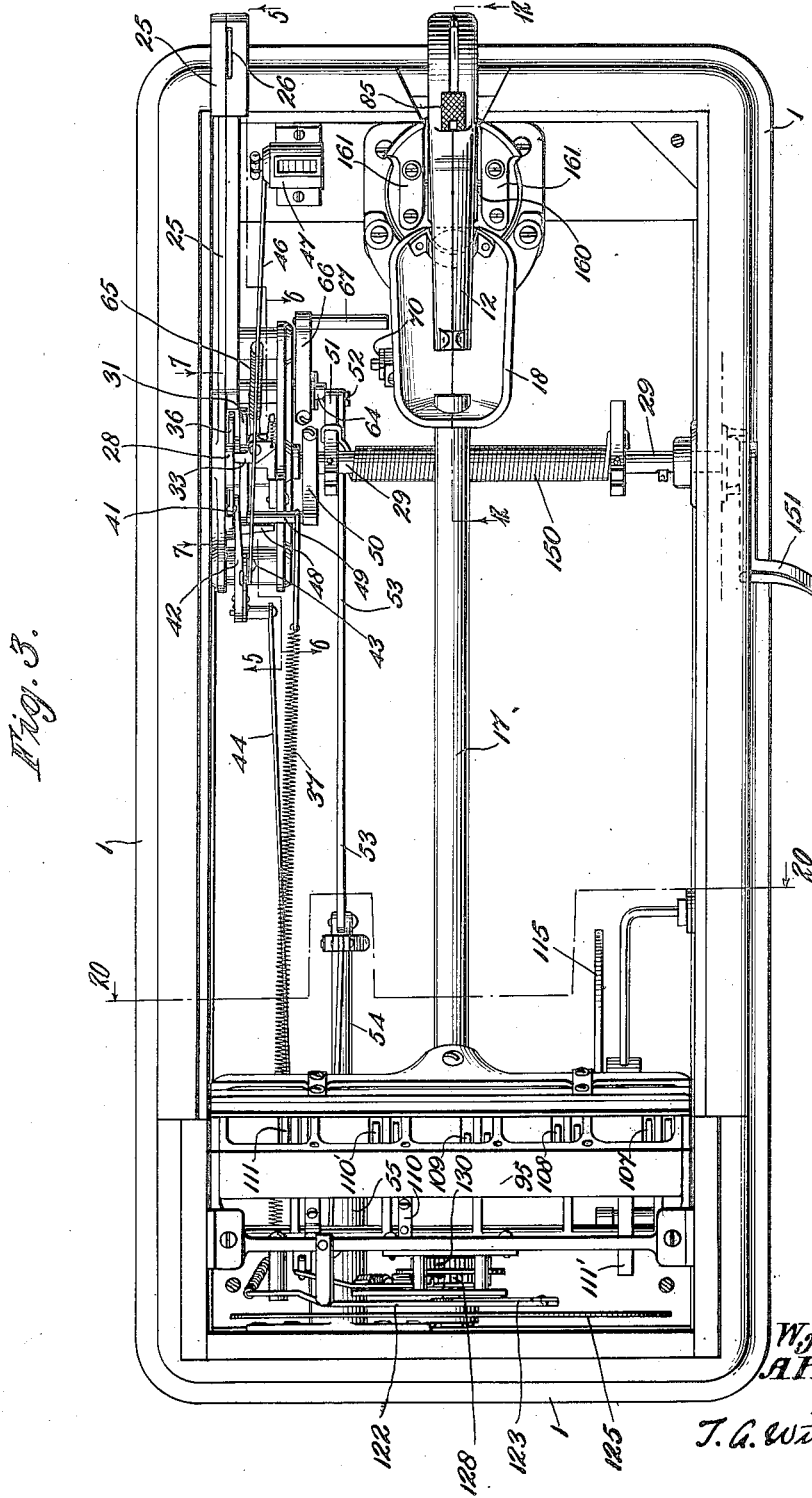
Figure 3 is a plan view similar to Figure 1 with certain parts removed and illustrating the organization of the various parts.
Figure 13:
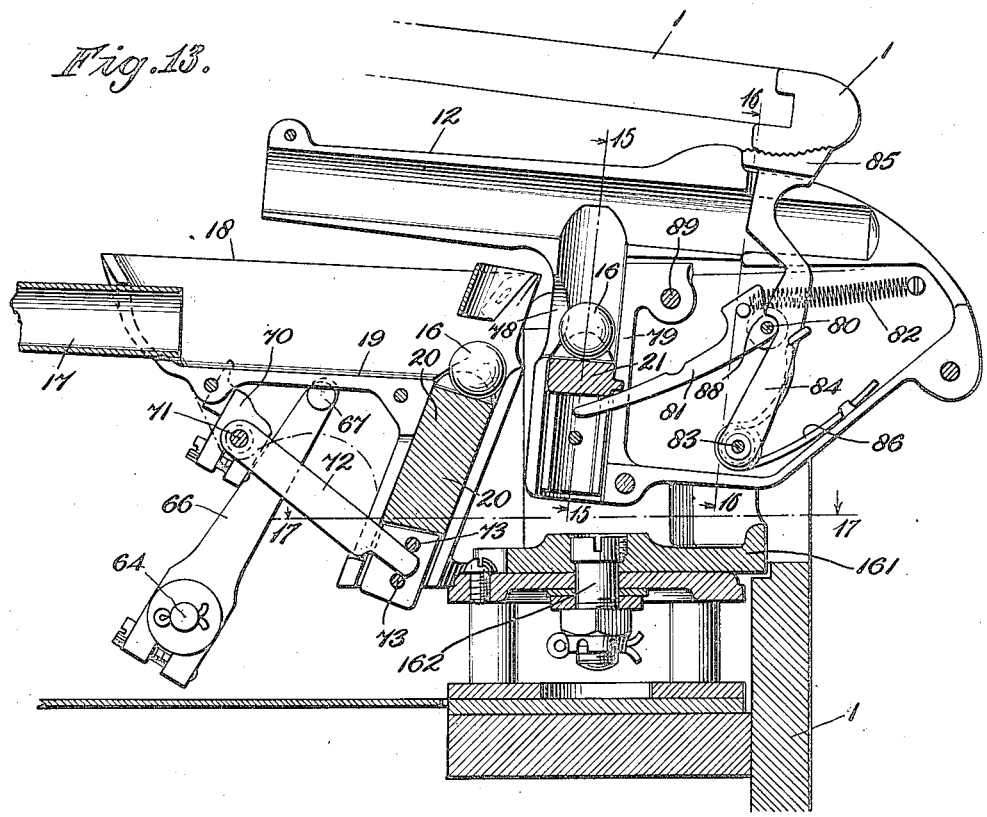
Figure 13 is an enlarged sectional view of the rear portion of the machine illustrating the gun and the projectile propelling mechanism.

Figure 17 of a sectional view in plan taken on the line 17—17 of Figure 13, looking in the direction of the arrows;

Figure 18 is a view of the projectile elevating mechanism on an enlarged scale;

Figure 19 is a sectional view taken on the line 19—19 of Figure 18, looking in the direction of the arrows;

Figure 20 is a cross sectional view taken on the line 20—20 of Figure 3;

Figure 21 is a cross sectional view of the tray shown in Figure 2;

Figure 22 is a sectional view taken on the line 22—22 of Figure 20, looking in the direction of the arrows;

Figure 23 illustrates the bell actuating mechanism in section;

Figure 24 is a view of the dial indicating plate and its associated parts;

Figure 25 is a view of a portion of the parts shown in Figure 24, and illustrating the dial releasing mechanism;

Figure 26 is a detail view of the dial ratchet and coacting parts;

Figure 27 is a detail view of the dial rack and pinion;

Figure 28 is a side elevational view of the ratchet and pinion shown in Figures 26 and 27; and Figure 29 is a view of the dial actuating rock shaft.

1 indicates any suitable frame work or supporting casing for the actuating mechanism, 2 a glass cover for the top of said casing, 3 a metal tray for receiving the projectiles located immediately beneath the glass cover, having the general shape shown in Figure 2, and provided with the holes 4, 5, 6, 7 and 8, at one end, with the holes 9 and 10 at its other end, and the enlarged oval shaped slot 11 between the holes 9 and 10. As will be understood from Figures 2 and 4, a projecting means or gun 12 occupies the slot 11 and the holes numbered from 4 to 8, correspond to targets illustrated in Figure 20.

It will be observed that the bottom 15 of said tray 3 is curved and extends upwardly until said holes 4 to 8 are reached, and it will appear below that after the projectiles 16 are fired from the gun 12, illustrated in Figure 14, if they reach one of the several holes 4 to 8, they pass down to the return passage or tube 17 which leads them back into the receptacle or tray 18, see Figure 18, whereupon said projectiles roll on down over the bottom 19 of said tray 18 until they reach the top of the elevator or plunger 20, as best shown in Figure 13.

Figure 14:
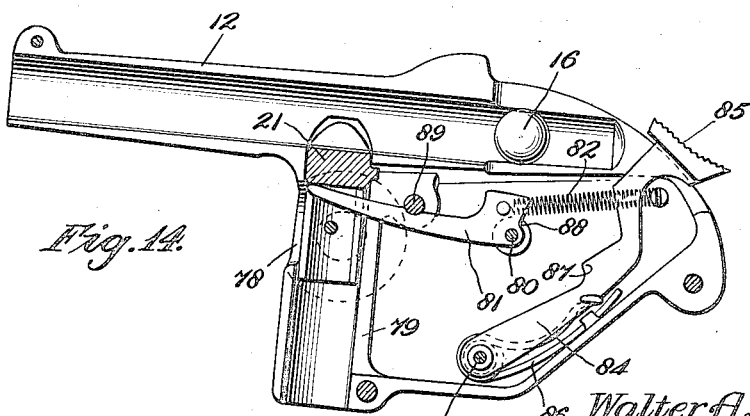
Figure 14 is a sectional view of the gun removed from the casing.

It will further appear below that upon raising the said plunger 20 by mechanism to be described, said projectiles 16 are brought into the position above the elevator member 21, see Figure 13, which upon being itself raised, as illustrated in Figure 14, the said projectiles are brought into the bore of the gun, whereupon they are again propelled forward, toward the targets.

Figure 1:
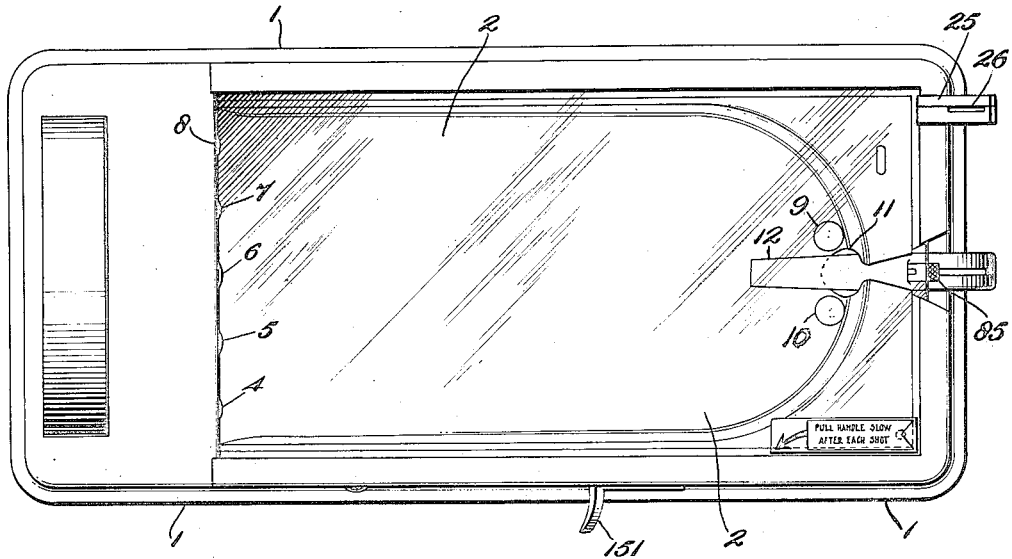
Figure 1 is a plan view of an apparatus made in accordance with this invention.

It is preferred to operate this amusement device through the medium of a coin, although this is not essential. But when a coin is to be employed, there is provided a chute 25, see Figures 1 and 3, having an orifice 26 for the admission of the coin 27, which leads said coin to a disk shaped member 28, mounted on the main operating shaft 29, see Figures 5 and 7. The coin 27 is held in the position shown in Figure 7 by the cut away portion 30 of the disk 28, until said disk is rotated. Said disk 28 is loosely mounted on the shaft 29 and has rigidly attached thereto the five pronged star wheel 31 which is therefore also loosely mounted on said shaft. Rigidly mounted on said shaft is the boss 34, see Figure 6, carrying the enlargement 32 on which is pivoted the pawl 33, and which extends over the star wheel 31 and into the slots 35 of the teeth 36 with which the disk 28 is provided, all as will be clear from Figures 3, 5, 6 and 7.

Figure 5:
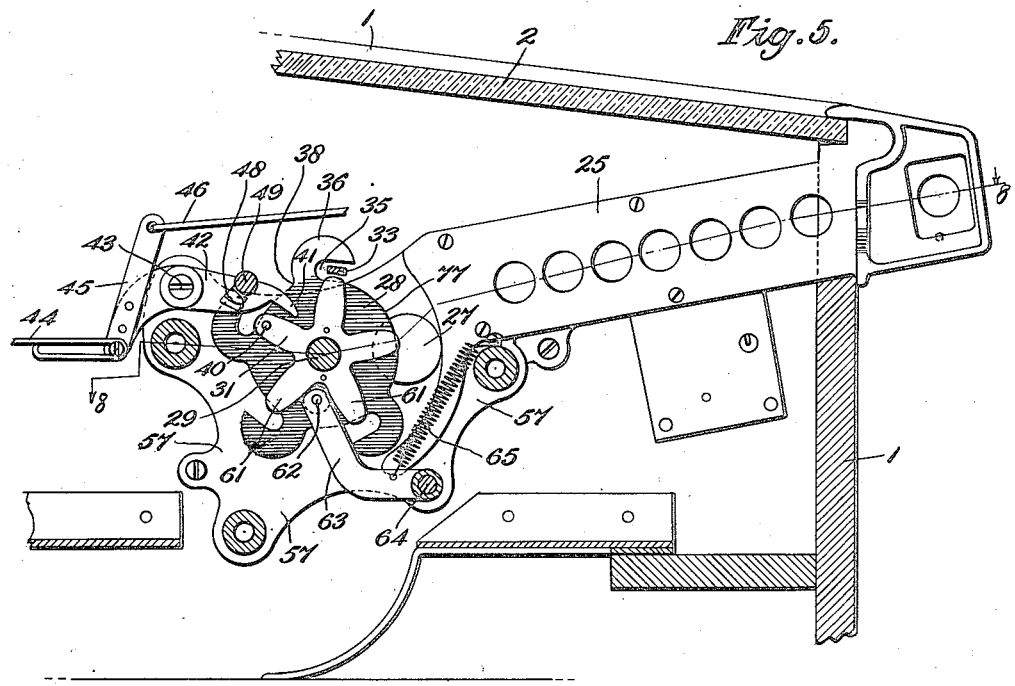
Figure 5 is an enlarged side elevational sectional view taken on the line 5—5 of Figure 3, looking in the direction of the arrows.

In other words, when the operating shaft 29 and pawl 33 are rotated in a clockwise direction, as seen in Figure 5, said pawl will contact with the coin 27 and force it around an arc of 72 degrees with the disk 28 and star wheel 31, whereupon said coin drops into a suitable receptacle not shown, and the rotation of the shaft reaches its limit of movement. When this happens the spring 150 surrounding shaft 29, in a manner to be described, returns the shaft and pawl 33 to their normal positions whereupon said pawl 33 will pass the next tooth 36, and be ready to contact with the back thereof at a point such as 38, Figure 5, and to rotate said disk through another arc of 72 degrees when the shaft 29 is again oscillated.

Figure 4:
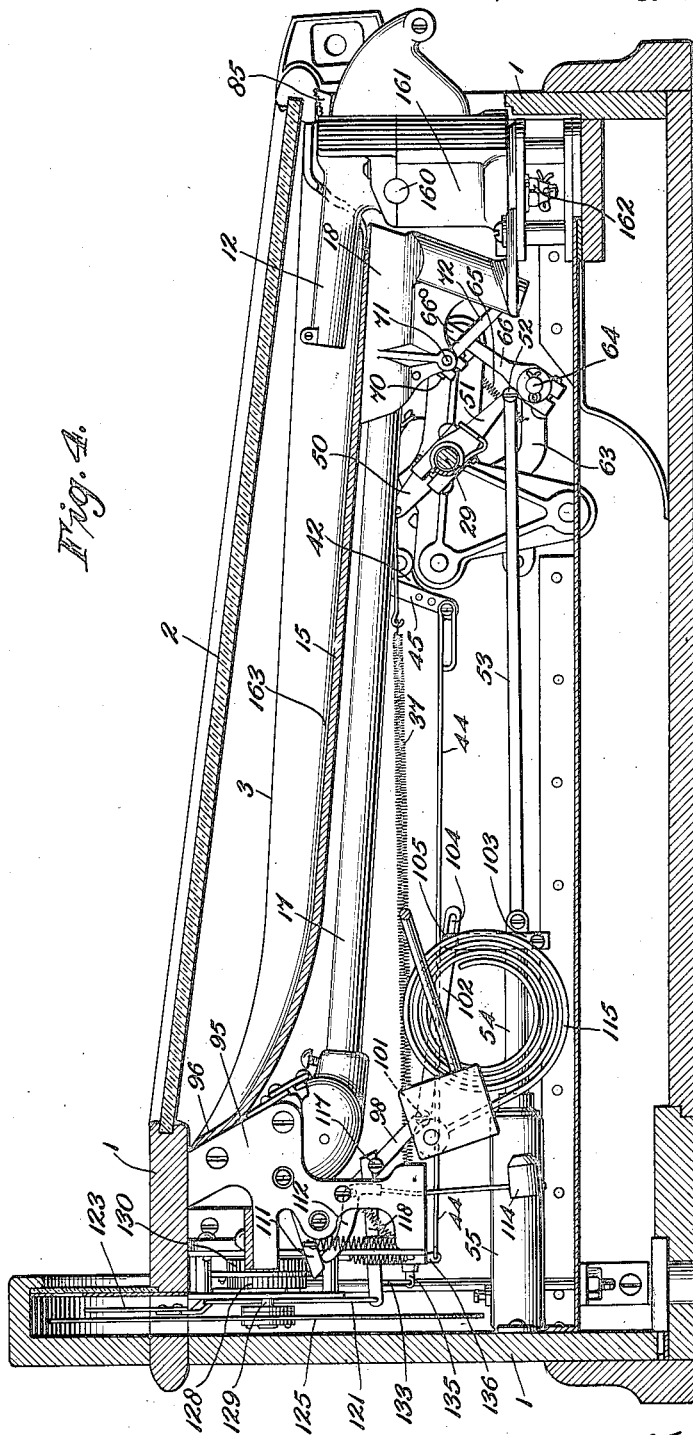
Figure 4 is a longitudinal sectional view partly in side elevation, showing a portion of the parts illustrated in Figure 3.

The star wheel 31 is provided with a single pin 40, see Figure 5, which takes against the end 41 of a dog 42 pivoted at 43, and attached at its opposite end to the rod 44 for a purpose disclosed below. Also rigid with said dog 42 is the member 45 to which is attached the rod 46, leading to the register or counter 47, as best shown in Figure 3. Said dog 42 is also provided with the projection 48 adapted when lifted by the pin 40 to be struck by the projection 49 carried by the arm 50 rigid with the shaft 29 and under the control of spring 37, all as will be clear from Figures 3, 5 and 6. The arm 51 extends in a direction 180 degrees from the arm 50, and is also rigid with shaft 29, see Figure 6, and is connected as at 52 with the rod 53 connected to the piston rod 54 of the shock absorber or cushioning device 55, as best shown in Figure 4. 56 represents one supporting frame plate and 57 a parallel disposed supporting frame plate, see Figure 8. 58 indicates a pawl controlled by the spring 59, and adapted to engage the ratchet 60, see Figure 6, so that when the shaft 29 is turned, it must complete its oscillation before it can return for a purpose that will presently appear.

Contacting with the star wheel 31 between adjacent teeth 61 thereof, is the roller 62 carried by the lever 63 rigid with the oscillating shaft 64 and controlled by the spring 65 as plainly shown in Figure 5. Rigid with said shaft 64 is the arm 66 (see Figures 3, 4, 6, 8 and 13) carrying the operating pin 67 adapted in its oscillations to and fro to strike the lug 70 carried by the rock shaft 71, on which is rigidly mounted the operating arm 72 pivoted to the projectile lifter 20 between the pins 73, alll as will be clear from Figures 3, 8, 13 and 18.

From the construction so far disclosed, it will now be clear that should a projectile 16 be fired from the gun 12 by a means to be described, said projectile will race up the inclined curved surface 15 of the tray 3, and will either pass through one of the holes numbered from 4 to 8, or will return on said surface 15 back to the gun 12 and pass through one of the holes 9 or 10. In either case, the said projectile 16 will find its way back into the receptacle or tray 18, and will by gravity pass to a position above the projectile lifter 20. Should the machine be operated by a coin, such as a penny, said coin will pass through the opening 26 in the chute 25 and find its way down to the position shown in Figure 7, contacting against the disk 28, whereupon an operation of the main power shaft 29 by its handle 151, Figures 1, 3 and 12, will rotate the member 34 carrying the pawl 33, see Figure 6, and said pawl contacting with said coin 27 will rotate the disk 28 through an angle of 72 degrees, whereupon the shaft 29 being automatically returned by the spring 150, said pawl 33 will snap back past one of the lugs 36 of the disk 28, and be ready to contact with the back of said lug 36 at the point 38, see Figure 5, upon the next operation, all as intimated above.

In the meantime, the coin 27 falls into a receptacle not shown, and a further oscillation of the shaft 29 will cause the pawl 33 to move another of the lugs 36 forward through another arc of 72 degrees. In this manner, owing to there being four lugs 36 and a coin in position, the shaft 29 may be operated five times after the insertion of said coin. But when the space 77, on the disk 28, is reached, which is provided by the omission of one of the lugs 36, then if no additional coin 27 has been placed in the machine, the said pawl 33 will merely move forward and back again without turning the said disk 28 at all.

In other words, the disk 28 can only be operated five times in the construction shown after a coin has been introduced into the chute 25, and will then cease to operate, until another coin has been placed in the machine. In the meantime, upon each rotation of the disk 28 through an arc of 72 degrees, the roller 62, see Figure 5, which normally occupies a position between a pair of adjacent teeth 61 of the star wheel 31, will be forced downwardly through the turning of said star wheel 31, and this movement of the roller 62 will depress the lever 63 against the tension of the spring 65, and thus rock the shaft 64, causing the oscillation of the arm 66, and the movement to and fro of the operating arm 67 which strikes the head or lug 70 carried by the rock shaft 71 which in turn rocks the arm 72 and raises the projectile lifter 20, so as to bring the latter in the position shown in Figure 13, all as is also disclosed above. In the meantime, the turning of the star wheel 31 brings the operating pin 40 at the end of each revolution underneath the arm 41 of the lever 42 and rocks the same on its pivot 43, thus exerting a pull on the rod 44, for a purpose to be disclosed below, and the rocking of the shaft 29 turns the arm 50, and thus brings the operating pin 49 carried thereby against the lug 48 mounted on the lever 42, and depresses the end 41 of said lever and thus restores it to its former position. Further, the rocking or oscillation of the shaft 29 turns the lever 51 or rather, oscillates the same, and thereby exerts a pull on the rod 53, which actuates the piston rod 54 of the cushioning device 55. Also the turning of the lever 42, see Figure 5, oscillates the member 45, rigid therewith, which reciprocates the rod 46 connected with the counter or register 47, and thus counts on the register each revolution of the star wheel 31, and incidentally, the number of coins which have been introduced into the chute 25.

The projectile 16 having rolled into the position shown in Figure 13 as above stated, the raising of the lifter 20 by means just described as illustrated in Figure 18, brings said projectile 16 into its position on top of the elevator 21, Figure 13, by reason of its passing by gravity through the hole 78 with which the hollow extension 79 of the gun 12 is provided.

Pivoted to said extensions 79, as at 80, is the lever 81, and 82 indicates a spring to return said lever against its stop 89 and to its elevated position shown in Figure 14. Pivoted at 83 is a thumb operated hammer-like or trigger-like lever member 84 adapted to be drawn back by a pressure on its head 85 against the compression of its main spring 86 and said trigger like lever 84 is provided with a projection 87 adapted to strike the lifting lever 81 at the point 88 and depress the same, against the tension of its spring 82, all as will be clear from Figures 13 and 14. The bore of the gun 12 being slightly inclined as shown, as soon as the projectile is lifted into said bore by the lever 81, it rolls down to the bottom thereof, whereupon the trigger member 85 being drawn back against the compression of spring 86 and released said projectile is propelled forward over the curved bottom of tray 3, as above mentioned.

The holes lettered 4, 5, 6, 7 and 8 in the forward end of said tray 3 are respectively in register with targets 90, 91, 92, 93 and 94, having the respective values 20, 10, 5, 15, and 25, marked on the casting 95 which latter is normally hidden by the upper flange 96 of tray 3, all as will be clear from Figures 1, 2, 3, 21, 22 and 23. The flat surfaces of casting 95 on which said targets are located are provided with slots 97, through which project the curved arms 100, one for each target, and which arms are rigid with a rock shaft 99 mounted to oscillate in the framework. Rigid with said rock shaft 99 is an actuating arm 98, see Figure 22, pivoted at 101 to the reciprocating actuating bar 102 having the slot 104 and receiving its motion from an arm 103 carried by the piston rod 54, through the pin connection 105 with said slot, as plainly shown in Figure 4.

Disposed parallel to the rock shaft 99 is another rock shaft 106, see Figures 22 and 29, provided with a plurality of pairs of arms 107, 108, 109, 110, 110', and 111, one for each curved member 100, and when a projectile 16 passes through one of the holes lettered from 4 to 8, in the tray member 3, and strikes a target it lands upon one of these pairs of arms, say 109, see Figure 22, and is held in the position shown until the corresponding curved member 100 is actuated by the rock shaft 99 to force down said pair of arms 109 and release the projectile 16 into the return tube 17, and thus convey it back to the gun 12. In the meantime, the arm 109 turns the rock shaft 106 which is provided with an arm 110 which actuates an indicating dial and other mechanism to be described below. Said rock shaft 106, as best shown in Figure 23, is also provided with an arm 111' which contacts with one end of the bell crank 112 pivoted at 113, which actuates the bell hammer 114 to sound the gong 115, see Figures 4 and 23.

It will thus be seen that should the projectile strike a target a gong will be sounded to indicate that fact, and at the same time, as will now be made clear, a flag or shield is removed from a dial plate which will indicate the score. That is to say, the actuating arm 98 carries thereon a pin 117, see Figures 22 and 24, to which is connected an arm 118 pivoted as at 119 to the post 120, and which carries at its rear end the rod 121 connected with the pivoted member 122 and adapted to actuate the shield or flag 123, and remove it from in front of the numbers 124 carried by the disk 125, all as will be clear from Figures 22, 24 and 25.

In other words, when a target is struck, the score that has been made will be indicated to the operator. It was mentioned above that when a target had been struck and the lock shaft 106 operated, an arm 110, see Figure 22, would also be operated. This said arm is provided with the projection 126, which actuates the rack 127, see Figures 27 and 28, to turn the gear 128 mounted on the shaft 129 through an arc in proportion to the value of the target struck. That is to say, the pairs of arms lettered from 107 to 111 in Figure 29 are of different lengths according to the values that are ascribed to the targets, and therefore, said rock shaft 106 and actuating arm 110 will be turned through arcs proportional to the values of said targets and said arm 110 will likewise turn the gear 128 and shaft 129 through proportional distances and therefore will the disk 125 be turned through such an arc as will indicate the value of the target struck. After the disk 125 has been thus turned to show the value of the shot and after the shield 123 has been removed from the scale in the manner above disclosed, then it is necessary to return the disk 125 to zero. This is accomplished in the following manner:

Mounted on said shaft 129 is a ratchet wheel 130 controlled by the pawl 131 pivoted as at 132 and in turn controlled by the rod 133, see Figures 25 and 26. Said rod 133 is attached to one arm of the bell crank 134 see Figure 22, pivoted as at 135, and whose other arm 136 is attached to the rod 44 which, as above described, and actuated through the lever 42, and member 45, see Figures 4 and 5, upon each complete rotation of the star wheel 31.

In other words, referring especially to Figure 28, it will be observed that each time a target has been struck, the arm 110 will add up on the pinion 128 and disk 125 the full value of said target, while when a complete rotation of the star wheel 31 has been made, the pawl 131 will be lifted from the ratchet 130, and the disk 125 will be released. When this happens, the spring 138, Figure 24, will return said disk to its zero position. But before said disk is returned the shield 123 will, through the mechanism disclosed, be removed from the score to let the operator know the total value of his shots.

It will further be observed that the targets numbered from 90 to 94 are of different values, and the holes numbered from 4 to 8, see Figure 21, are of a size corresponding to the smallness of their values. That is to say, hole 6 covering the target 5 is the largest, and therefore the easiest to enter, but the target is of the smallest value. The hole 8, on the other hand, corresponds to the target 25, it is the smallest in size, and the most difficult to enter, but the target is of the largest values. Therefore, the successful operation of this device involves considerable skill on the part of the operator.

In order to exercise this skill to its maximum the gun 12 is mounted for elevation and for lateral movement by the means now to be described. Referring more particularly to Figures 13 to 20, it will be observed that said gun 12 is provided with trunnions 160 mounted in the supports 161, so that the bore of the gun may be elevated at will. The support or framework for the gun 161 is further mounted for lateral training on the central pivot 162, so that the operator may train the gun on the smallest hole 8, located on his extreme right, or on the hole 4, located on his extreme left; and if in any case the projectile does not in his judgment have sufficient elevation, he can depress the breech of the gun, and thereby elevate the muzzle thereof so as to cause the projectile to strike at points farther away from the muzzle. On the other hand, should he believe his chances are better by depressing the muzzle of the gun and causing the projectile to roll continuously along the bottom 15 of the tray 3, he can readily raise the breech of said gun and roll his projectiles toward the targets. As a matter of fact, the extreme curved edges 163 and 164, see Figures 4 and 21, are so shaped as to exercise the operator's skill, in that they gradually approach the holes 4 to 8 and the operator can readily fire his projectiles against said edges and take his chances of entering one of said holes.

It will thus be seen that the use of this device involves not only the operator's judgment in training his gun, but also his judgment in the feel or strength of the spring 86. In other words, he can judge by the feel of the hammer 85 about how strong the spring is, and therefore whether it is best to roll his projectiles toward the target or to fire them at a higher elevation.

As intimated above, after each shot, the handle 151 must be operated to turn the disk 28 and its co-acting parts, and of course, since the turning of this handle operates so many different parts, it is essential that the shaft shall turn through a sufficient arc each time to perform all of its functions.

Figure 6:
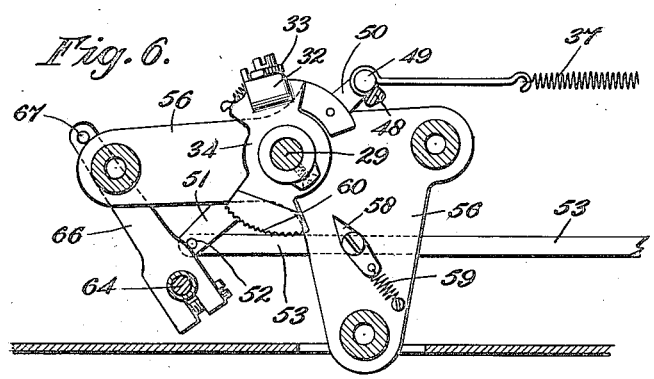
Figure 6 is an enlarged detail sectional view of a portion of the parts shown in Figure 5, taken on the line 6—6 of Figure 3, looking in the direction of the arrows.
Figure 7:
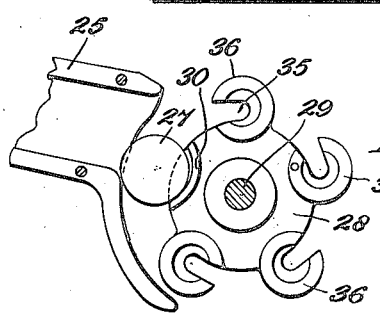
Figure 7 is an enlarged detail view taken on the line 7—7 of Figure 3, looking in the direction of the arrows.

In order to compel the operator to thus complete the stroke or oscillation of the shaft 29, the pawl and ratchet 58 and 60, see Figure 6, have been provided. Further, should the parts jam through rust or for any other cause, an operator is liable to exert a sudden pressure on the machine, and therefore to more or less injure the parts. To prevent such injury, the powerful coil spring 150 has been provided which has in itself sufficient strength to transmit all the power necessary, and the shaft 29 is divided into two parts as indicated in Figure 8. That is to say, the one part carries a pin 165 working in a slot 166, in the other part, and the spring transmits the power from one part to the other, while said pin 165 is moving in said slot. But should the spring become broken or not be sufficiently powerful the pin 165 will reach the end of the slot and still turn the other part of the shaft 29.

It will now be clear that this invention provides a propelling mechanism 12, preferably in the form of a gun, which is spring actuated; a loading mechanism for said gun illustrated in Figures 13 to 18, which is under the control of the star wheel 31; an indicating mechanism consisting of the disk 125 and its associated connections, on which the shots may be registered or added, and which disk is under the control of the spring 138 and pawl 131 for its return to zero, while the pawl is under the control of the disk 28, and wheel 31 through the pin 40 and lever 42 and its connections. It will be further seen that the rock shaft 99 and curved arms 100 are under the control of the rod 53, and arm 51, rigid with shaft 29.

The foregoing operation of the mechanism has been disclosed in connection with a coin 27 contacting with the disk 28, but it is evident that instead of the vacant space 77 occupied by said coin, the corresponding tooth 36, which was omitted to supply said space, may be provided on said wheel 28, and that in such case no coin would be needed.

It is obvious that those skilled in the art may vary the details of construction as well as the arrangement of parts without departing from the spirit of the invention and therefore we do not wish to be limited to the above disclosure except as may be required by the claims.

What we claim is:

1. In an amusement device, the combination of a pivoted propelling means comprising a spring controlled hammer having a thumb engaging means integral therewith for manual operation; a mounting for said propelling means permitting motion in horizontal and vertical planes; a surface over which projectiles from said means may travel; a target associated with said surface; means comprising a reciprocating member associated with said target to receive projectiles that strike the said target; and additional reciprocating means for lifting and automatically returning said striking projectiles to said propelling means, substantially as described.

2. In an amusement device, the combination of a propelling means comprising a spring controlled hammer having a means for manual operation; a mounting for said propelling means permitting motion in horizontal and vertical planes; a surface over which projectiles from said means may pass; a target associated with said surface; means comprising a reciprocating member to receive projectiles that strike the target; means connected with said last named means for indicating the value of the target struck; and a shaft and connections comprising a star wheel, a rock shaft actuated by said star wheel and a vertically reciprocating plunger operated by said rock shaft for operating said indicating means and reloading said propelling means, substantially as described.

3. In an amusement device, the combination of a spring actuated propelling means comprising a spring controlled hammer having a means for manual operation; a mounting for said propelling means permitting motion in horizontal and vertical planes; a surface over which projectiles from said means may pass; a transparent cover located above said surface; a target associated with said surface; means to receive projectiles that strike the target; means connected with said last named means for indicating the value of the target struck; means comprising a reciprocating member for automatically returning the striking projectiles to the propelling means; means comprising an additional reciprocating member for delivering the returned projectile to the hammer of the propelling means; and a shaft and connections for operating said indicating means and reloading said propelling means, substantially as described.

4. In an amusement device, the combination of a pivoted propelling means, comprising a spring controlled hammer having a means for manual operation; a mounting for said propelling means permitting motion in horizontal and vertical planes; a curved surface over which projectiles from said means may pass; a target associated with said surface; means to receive projectiles that strike the target; movable means connected with said last named means for indicating the value of the target struck; and a shaft and connections comprising a star wheel for operating said indicating means and reloading said propelling means, substantially as described.

5. In an amusement device, the combination of a pivoted spring operated gun comprising a spring controlled hammer having a means for manual operation; a mounting for said propelling means permitting motion in horizontal and vertical planes; a curved tray over which projectiles from said gun may pass; a target associated with said tray; an indicating means associated with said target; an actuating means associated with said target and indicating means adapted to register the value of said target when struck on said indicating means and to operate a signal; means to return the striking projectiles to the gun; and a shaft and star wheel to operate said actuating means, substantially as described.

6. In an amusement device, the combination of a pivoted spring operated gun comprising a spring controlled hammer having a means for manual operation; a curved tray over which projectiles from said gun may pass; a target associated with said tray; an indicating means comprising a rotatable disk associated with said target; an actuating means associated with said target and indicating means adapted to register the value of said target when struck on said indicating means and to operate a signal; means comprising a passage to return the striking projectile to the gun; means to lift the returned projectiles into the bore of the gun; and a shaft to operate said actuating and lifting means, substantially as described.

7. In an amusement device, the combination of an operating shaft; a disk loosely mounted on said shaft; a star wheel loosely mounted on said shaft; a pawl rigid with said shaft adapted to turn said disk and star wheels through predetermined arcs at each operation of said shaft; a target; an indicating means; gun like means to propel projectiles onto said target; means to return said projectiles to said gun like means after each shot; means to cause the value of the target when struck to be registered on said indicating means, connections between said disk and indicating means for controlling its indications; and connections operated by said star wheel for loading the returned projectiles into the gun like means, substantially as described.

8. In an amusement device, the combination of an operating shaft; a disk loosely mounted on said shaft; a star wheel loosely mounted on said shaft; a pawl rigid with said shaft adapted to turn said disk and star wheels through predetermined arcs at each operation of said shaft; a target; an indicating means; pivoted gun like means to propel projectiles onto said target; means to return said projectiles to said gun like means after each shot; means comprising a rock shaft and actuating means therefor to cause the value of the target when struck to be registered on said indicating means; connections between said disk and indicating means for controlling its indications; and connectons operated by said star wheel for loading the returned projectiles into the gun like means, substantially as described.

9. In an amusement device the combination of an operating shaft; a disk loosely mounted on said shaft; a star wheel loosely mounted on said shaft; a pawl rigid with said shaft adapted to turn said disk and wheel through predetermined arcs at each operation of said disk; an indicating means and connections controlled by said disk; a spring actuated gun comprising a spring controlled hammer having a means for manual operation; a loading means for said gun; connections controlled by said star wheel for actuating said loading means; a plurality of targets; means provided with a playing surface between said targets and said gun; and means for employing projectiles which strike said targets for registering the value of said targets on said indicating means, substatntially as described.

10. In an amusement device, the combination of an operating shaft; a disk loosely mounted on said shaft; a star wheel loosely mounted on said shaft; a pawl rigid with said shaft adapted to turn said disk and wheel through predetermined arcs at each operation of said disk, an arm rigid with said shaft; an indicating means and connections controlled by said disk; a spring actuated gun comprising a spring controlled hammer having a means for manual operation; a loading means for said gun; connections controlled by said star wheel for actuating said loading means; a plurality of targets; means provided with a playing surface between said targets and said gun; and means comprising a rock shaft operated by said arm for employing projectiles which strike said targets for registering the value of said targets on said indicating means, substantially as described.

11. In an amusement device, the combination of an operating shaft; a disk loosely mounted on said shaft; a star wheel loosely mounted on said shaft; a pawl rigid with said shaft adapted to turn said disk and wheel through predetermined arcs at each operation of said disk; an indicating means and connections controlled by said disk; a spring actuated gun; a loading means for said gun; connections controlled by said star wheel for actuating said loading means; a plurality of targets; and means comprising a rock shaft having an arm for each target and a second rock shaft adapted to be operated by the arms of said first named rock shaft and the projectiles which strike the target to register the values of each target on said indicating means, substantially as described.

12. In an amusement device, the combination of an operating shaft; a disk loosely mounted on said shaft; a wheel loosely mounted on said shaft; means for operating said disk and wheel from said shaft; a target; a gun for firing projectiles at said target; means for returning the fired projectiles to said gun; means for indicating the value of the target when struck; means actuated by said wheel for reloading the fired projectiles into the gun after their return thereto; and means operated by said disk for controlling said indicating means, substantially as described.

13. In an amusement device, the combination of an operating shaft; a disk loosely mounted on said shaft; a wheel loosely mounted on said shaft; means for operating said disk and wheel from said shaft; a target; a gun for firing projectiles at said target; means for returning the fired projectiles to said gun; means for indicating the value of the target when struck; means comprising a lifting device actuated by said wheel for reloading the fired projectiles into the gun after their return thereto; and means comprising a pawl and connections operated by said disk for controlling said indicating means, substantially as described.

14. In an amusement device, the combination of an operating shaft; a wheel loosely mounted on said shaft; means rigid with said shaft for turning said wheel through predetermined arcs; a gun adapted to fire projectiles; means comprising a reciprocating member for returning the fired projectiles to said gun; a lifting device comprising an additional reciprocating member for said returned projectiles; and connections between said wheel and said lifting device for operating the latter, substantially as described.

15. In an amusement device, the combination of an operating shaft; a wheel loosely mounted on said shaft; means rigid with said shaft for turning said wheel through predetermined arcs; a gun adapted to fire projectiles; means for returning the fired projectiles to said gun; a lifting device comprising a reciprocating member for said returning projectiles; a spring controlled elevating means comprising an additional reciprocating member adapted to receive projectiles from said lifting device; and connections between said wheel and said lifting device for operating the latter, substantially as described.

16. In an amusement device, the combination of a gun comprising a pivoted spring operated and hand controlled hammer; a spring controlled elevating means comprising a reciprocating member adapted to lift projectiles to positions in front of said hammer; a lifting device comprising an additional reciprocating member adapted to lift projectiles into positions to be fed to said elevating means; an operating shaft and connections for actuating said lifting device, a target; and a playing surface connecting said gun and target; substantially as described.

17. In an amusement device, the combination of a pivoted gun comprising a pivoted spring operated hand controlled hammer; a spring controlled elevating means comprising a reciprocating member adapted to lift projectiles to positions in front of said hammer; a lifting device comprising an additional reciprocating member adapted to lift projectiles into positions to be fed to said elevating means; an operating shaft and connections comprising a rock shaft for actuating said lifting device, a target; and a playing surface connecting said gun and target; substantially as described.

18. In an amusement device, the combination of a disk adapted to receive a coin; an operating shaft on which said disk is loosely mounted; a wheel rigid with said disk; means rigid with said shaft for contacting with said coin and disk to operate said disk and said wheel; a gun adapted to fire projectiles; a lifting means for said projectiles; connections between said lifting means and said wheel; a score indicating means; and connections between said disk and said score indicating means, substantially as described.

19. In an amusement device, the combination of a disk adapted to receive a coin; an operating shaft on which said disk is loosely mounted; a wheel rigid with said disk; means rigid with said shaft for contacting with said coin and disk to operate said disk and said wheel; a register for the coins received by said disk; a gun adapted to fire projectiles; a lifting means for said projectiles; connections between said lifting means and said wheel; a score indicating means; connections between said disk and said score indicating means; and connections between said disk and said register, substantially as described.

20. In an amusement device, the combination of an operating shaft; a gun loading means operatively connected to said shaft; a shot indicating means operatively connected to said shaft; a target having a value assigned thereto; means including the shot striking said target for adding up on said indicating means the value of said target, a pivoted gun provided with a spring propelled hand operated hammer; and a playing surface connecting said gun and target; substantially as described.

21. In an amusement device, the combination of an operating shaft; a gun loading means operatively connected to said shaft; a shot indicating means operatively connected to said shaft; a shield for said indicating means operatively connected to said shaft; means associated with said shaft to compel a complete stroke thereof; a target having a value assigned thereto; means including the shot striking said target for adding up on said indicating means the value of said target, a pivoted gun provided with a spring propelled hand operated hammer; and a playing surface connecting said gun and target; substantially as described.

22. In an amusement device, the combination of a propelling means; comprising a spring controlled hammer having a thumb engaging member integral therewith; means for pivoting said propelling means for movement in a horizontal direction; means for pivoting said propelling means for movement in a vertical direction; a surface over which projectiles from said propelling means may travel; a target associated with said surface; means for returning the fired projectiles over the said surface; and means comprising a pair of reciprocating lever operated members for automatically lifting the said fired projectiles to said propelling means, substantially as described.

23. In an amusement device, the combination of a propelling means comprising a spring controlled hammer having a thumb engaging member integral therewith; means for pivoting said propelling means for movement in a horizontal plane; means for pivoting said propelling means in a vertical plane; a surface over which projectiles from said propeller means may pass; a target associated with said surface; means to receive projectiles that strike the target; means connected with said last named means for indicating the value of the target struck; and means for returning over the said surface said fired projectiles and means comprising two lever operated reciprocating members for automatically lifting the fired projectiles into said propelling means, substantially as described.

24. In an amusement device, the combination of a propelling means comprising a spring controlled hammer having a thumb engaging member integral therewith; means for moving said device in a vertical and in a horizontal plane at will when aiming the same; a target toward which projectiles from said means may travel; means associated with said target for returning the fired projectiles; and means comprising a pair of lever operated reciprocating members for lifting into and loading the returned projectile into said propelling means, substantially as described.

In testimony whereof we affix our signatures.

WALTER A. TRATSCH.
ARCHIE H. BECHTOL.